2,491,424

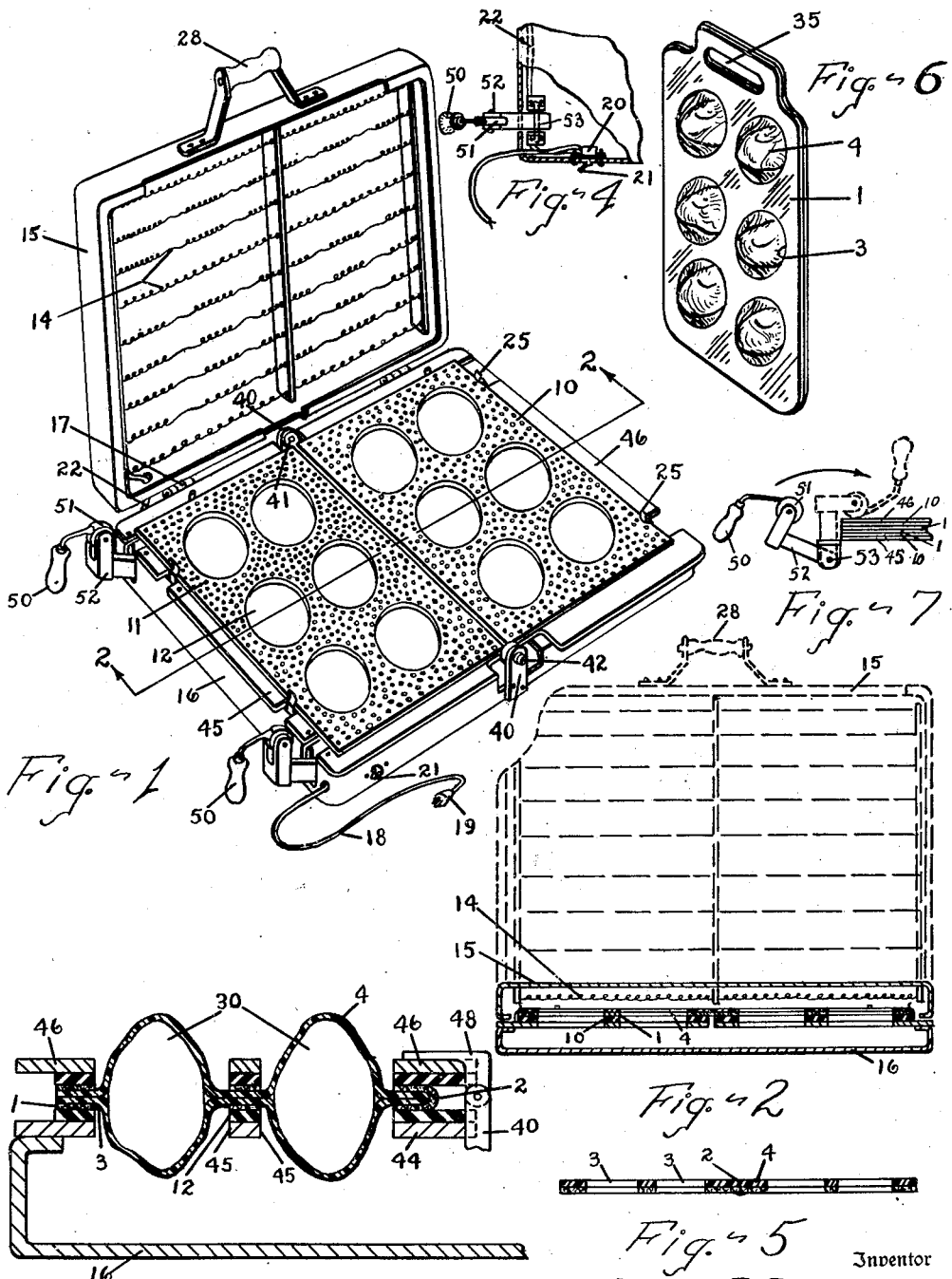
Dec. 13, 1949     J. F. STALTER     2,491,424
PACKAGING APPARATUS
Filed Aug. 18, 1947
Inventor
JOSEPH F. STALTER
R. H. Waters
Attorney Patented Dec. 13, 1949

UNITED STATES PATENT OFFICE 2,491,424

PACKAGING APPARATUS

Joseph F. Stalter, Akron, Ohio, assignor to Wingfoot Corporation, Akron, Ohio, a corporation of Delaware Application August 18, 1947, Serial No. 769,236

2 Claims. (Cl. 18—19)

This invention relates to packaging apparatus designed for the packaging of fruits, vegetables and other articles between two plies of thermostretchable thermosealable film fastened to cardboard or the like, with coinciding holes in the latter to accommodate and support the packaged articles.

The apparatus includes a work-table for holding a stiff paper material such as cardboard, pasteboard, chipboard, or the like. The work-table is divided down the middle so that the cardboard, etc., may easily be doubled over. The apparatus includes a heating element adapted to be brought down over the work-table to heat whatever is on it. The apparatus will be further described in connection with the accompanying drawings in which—

Fig. 1 is an isometric view of the apparatus;

Fig. 2 is a section on the line 2—2 of Fig. 1 with the top closed down over a laminated sheet of film united to cardboard or the like, and in phantom shows the top open;

Fig. 3 is a section on the same line, but with the work-table folded over and lemons, or the like, included in pockets stretched in the film;

Fig. 4 is a plan view of the corner of the apparatus with a corner of the work-table broken away to show certain details of the construction;

Fig. 5 is a section of the laminated sheet of cardboard or the like, covered with rubber hydrochloride film or other thermosealable thermostretchable film.

Fig. 6 is a view in perspective of the finished package with a half dozen lemons or the like enclosed in pockets in the film and supported in openings in the cardboard or the like; and Fig. 7 is an enlarged detail of the closing clamp.

In discussing the drawings it will first be advisable to have an understanding of how the apparatus works. A sheet 1 of cardboard or other stiff paper material is placed on the work-table of the apparatus. This cardboard is scored along the centerline 2 so that the board may easily be doubled. There are openings 3 in each half of the board and the openings are opposite to one another so that when the board is folded the openings coincide. There are twelve such openings—six in each half of the board. The rubber hydrochloride film 4, or other film, covers the cardboard and is heated. Then, after the objects are placed on the film on one-half of the cardboard, one above each opening, the two halves of the board are doubled together and the film is stretched over the opposite surfaces of the objects. At the same time the film between the objects is welded together as the film surfaces are pressed into contact with one another. Thus the objects are sealed in individual pockets in the film and supported in the pockets in the board.

In Fig. 1 the work-table 10 is formed of two pieces of rubber perforated with small holes 11 to increase its resilience, and larger holes 12 to accommodate the articles to be wrapped. The cardboard with appropriate openings in it, is laid on this work-table. Adhesive is applied to the upper surface of the cardboard and the rubber hydrochloride film or other suitable film is united to it. This may be done either before or after the cardboard is placed on the work-table.

Resistance coils 14 are built into the top 15 of the apparatus which is hinged to the bottom 16 at 17. The coils are connected with the wires 18 and plug 19 through the switchbox 20, with a switch handle 21, and wires 22.

The clips 25 hold the laminated sheet of cardboard and film in place. The openings 3 in the cardboard coincide generally with the openings 12 in the rubber, although they may be smaller. The top is brought down over the laminated sheet to heat the film. This is shown in Fig. 2. The top is then returned to the "open" position shown in Fig. 1 (and in phantom in Fig. 2). The handle 28 facilitates manipulation of the top.

Lemons 30, or other objects to be wrapped, are then placed on the heated film over the openings in one half of the cardboard. The package shown is adapted to hold six such articles. These objects are preferably pressed into the openings to stretch the film somewhat so that only about half of each of the objects is exposed above the surface of the board. The right half of the board is then folded over so as to be brought down onto the left half as shown in Fig. 3. The film covering the openings in the right half is stretched as the two halves are brought together. The contacting surfaces of the heated film in the areas surrounding the objects are pressed together with sufficient pressure to cause these surfaces to unite. The resulting package is shown in Fig. 5. Handholes 35 are preferably provided in each half of the board to provide easy means for carrying the finished package. The handholes are not necessary.

At the front and back of the bottom of the apparatus are the uprights 40 through which the pivots 41 and 42 pass. Under the rubber 10 in the left-hand portion of the work-table is a lightweight metal plate 44 which is preferably of aluminum. It is provided with openings 45 which approximately coincide with the openings 12 in the rubber pad. The plate 44 rests on the upper edge of the bottom frame 16 and may be welded or otherwise suitably fastened to it. The construction may be such that the plate may easily be replaced by one with openings of a different size and arrangement so that the same apparatus may readily be converted for the packaging of different objects.

The right-hand portion of the rubber 10 is supported by a similar light-weight plate 46 which is fastened to the hinges 48 pivoted to the supports 40 at the front and rear. This plate rests on the bottom frame 16, but is adapted to be swung on the pivots 41 and 42 to double the laminated sheet of packaging material as shown in Fig. 3.

Clamps are provided to apply pressure to the two halves of the packaging material when doubled over so as to heat-seal the contacting surfaces of film to one another. These clamps are operated by the handles 50. They each comprise a disc 51 eccentrically mounted in a standard 52. This standard passes through the frame 16 and is pivotally supported within the frame on the pin 53. When the right half of the work-table is folded over, the standard 52 is swung up as shown in dotted lines in Fig. 7 and the handle 50 is swung down so that the eccentric clamps the rubber-covered plates 44 and 46 together with the packaging material between them. Pressure is applied to seal the film-covered surfaces together.

Rubber hydrochloride is a preferred film because it retains its property of being stretched and heat-sealed for some little time after it has been heated. Thus, if rubber hydrochloride film is used, it may be cooled to room temperature before the packaging material is doubled to stretch and seal the film. Apparatus to be used with other film will ordinarily be enclosed to prevent the film from cooling.

Thus, the apparatus provides a work-table with rubber pads 10 which apply resilient pressure for stretching and sealing the packaging material when the work-table is doubled over. The apparatus includes heating means for simultaneously heating both halves of the film. The invention is not limited to the size of the packages produced or the number of articles packaged. Modifications may be made without departing from the invention which is defined in the appended claims.

What I claim is:

1. Packaging apparatus with its top hinged to its bottom, heating means over substantially the entire inner surface of the top, the upper surface of the bottom being divided into two substantially equal parts with holes in each arranged symmetrically with respect to the line dividing the parts, one of the parts being permanently held in the bottom half and the other hingedly mounted so that it may be folded over on to the permanently mounted half.

2. Packaging apparatus with its top hinged to its bottom, heating means over substantially the entire inner surface of the top, the upper surface of the bottom being of resilient material and divided into two parts, the two parts being adapted to be folded on to one another and openings in each part which coincide when the parts are thus folded, whereby packaging material placed on said upper surface of the bottom may be heated on its upper surface by the top of the apparatus and may be doubled over.

JOSEPH F. STALTER.

REFERENCES CITED

The following references are of record in the file of this patent:

UNITED STATES PATENTS

| Number | Name | Date |
| --- | --- | --- |
| 2,155,445 | Pittenger et al. | Apr. 25, 1939 |
| 2,246,317 | Parr | June 17, 1941 |
| 2,262,256 | Schoen | Nov. 11, 1941 |